US008102331B1

(12) United States Patent  (10) Patent No.: US 8,102,331 B1
Moscovitch  (45) Date of Patent: Jan. 24, 2012

(54) HORIZONTAL THREE SCREEN LCD DISPLAY SYSTEM

(76) Inventor: Jerry Moscovitch, Toronto (CA)

( * ) Notice: Subject to any disclaimer, the term of this patent is extended or adjusted under 35 U.S.C. 154(b) by 72 days.

(21) Appl. No.: 10/129,884

(22) PCT Filed: Nov. 13, 2000

(86) PCT No.: PCT/IB00/01646
§ 371 (c)(1),
(2), (4) Date: May 10, 2002

(87) PCT Pub. No.: WO01/35197
PCT Pub. Date: May 17, 2001

Related U.S. Application Data

(60) Provisional application No. 60/165,047, filed on Nov. 12, 1999.

(51) Int. Cl.
*G09G 5/00* (2006.01)
(52) U.S. Cl. ............... 345/1.1; 345/1.3; 248/917
(58) Field of Classification Search .......... 345/1.1, 345/1.3, 5, 6; 361/681–683, 600–603, 679.01–679.09, 361/679.21–679.29; 348/825, 826, 827; 248/122.1, 124.1, 917–924, 176.1, 176.2; 349/58
See application file for complete search history.

(56) References Cited

U.S. PATENT DOCUMENTS

| | | | |
|---|---|---|---|
| 0,723,114 A | 3/1903 | Witt | |
| 2,794,554 A | 6/1957 | Donner | |
| 2,939,237 A * | 6/1960 | Stein | 40/311 |
| 3,514,871 A | 6/1970 | Tucker | |
| 3,697,681 A | 10/1972 | McCoy | |
| 3,734,301 A | 5/1973 | Rastocny | |
| D229,348 S | 11/1973 | Ueda | |
| 3,858,836 A | 1/1975 | Marcyan | |
| 3,909,525 A | 9/1975 | Fagan | |
| D244,571 S | 6/1977 | Cowan, Jr. | |
| 4,112,423 A | 9/1978 | Bertolasi | |
| 4,159,417 A | 6/1979 | Rubincam | |
| 4,194,313 A * | 3/1980 | Downing | 40/610 |
| 4,382,572 A | 5/1983 | Thompson | |
| 4,453,687 A | 6/1984 | Sweere | |
| 4,453,695 A | 6/1984 | Sennott | |
| D278,820 S | 5/1985 | Woodhall | |
| 4,619,429 A | 10/1986 | Mazza | |
| 4,635,105 A | 1/1987 | Favreau | |
| 4,646,875 A | 3/1987 | Sholl | |
| 4,712,799 A | 12/1987 | Fraley | |
| D294,354 S | 2/1988 | West et al. | |
| 4,726,552 A | 2/1988 | Warshawsky | |
| 4,734,779 A | 3/1988 | Levis | |

(Continued)

FOREIGN PATENT DOCUMENTS

DE 29901751 4/1999

(Continued)

OTHER PUBLICATIONS

International Search Report—PCT/IB00/01646, ISA/EPO. Feb. 8, 2001.

(Continued)

*Primary Examiner* — Jason Mandeville

(57) ABSTRACT

Described herein is a support system for electronic displays having a support column and a bowed support arm having at least two docking stations. Each docking station is capable of supporting one display. The display supported therefrom can angle independently.

18 Claims, 6 Drawing Sheets

U.S. PATENT DOCUMENTS

| | | | |
|---|---|---|---|
| 4,761,641 A | 8/1988 | Schreiber | |
| 4,768,744 A * | 9/1988 | Leeds et al. | 248/280.11 |
| 4,770,303 A | 9/1988 | Boyd | |
| 4,772,942 A | 9/1988 | Tuck | |
| 4,797,942 A | 1/1989 | Burt | |
| 4,800,376 A | 1/1989 | Suga et al. | |
| 4,805,036 A | 2/1989 | Kido et al. | |
| D300,699 S | 4/1989 | Penrod | |
| 4,833,542 A | 5/1989 | Hara et al. | |
| 4,836,478 A | 6/1989 | Sweere | |
| 4,865,283 A | 9/1989 | Parker | |
| 4,865,420 A | 9/1989 | Schmidt | |
| D303,962 S | 10/1989 | Hebditch | |
| 4,920,458 A | 4/1990 | Jones | |
| 5,035,392 A | 7/1991 | Gross | |
| 5,122,941 A | 6/1992 | Gross et al. | |
| 5,128,662 A | 7/1992 | Failla | |
| 5,177,616 A | 1/1993 | Riday | |
| 5,195,709 A | 3/1993 | Yasushi | |
| 5,210,656 A | 5/1993 | Williamson | |
| 5,224,861 A | 7/1993 | Glass et al. | |
| D340,049 S | 10/1993 | Moscovitch et al. | |
| D340,235 S | 10/1993 | Robak et al. | |
| 5,292,099 A * | 3/1994 | Isham et al. | 248/442.2 |
| 5,383,642 A | 1/1995 | Strassberg | |
| 5,467,102 A | 11/1995 | Kuno et al. | |
| 5,505,424 A | 4/1996 | Nieman | |
| D371,449 S | 7/1996 | Huang | |
| 5,534,888 A | 7/1996 | Lebby et al. | |
| 5,537,127 A | 7/1996 | Jingu | |
| 5,537,290 A | 7/1996 | Brown et al. | |
| 5,589,849 A | 12/1996 | Ditzik | |
| 5,673,170 A | 9/1997 | Register | |
| 5,687,939 A * | 11/1997 | Moscovitch | 248/122.1 |
| 5,709,360 A * | 1/1998 | Rosen | 248/278.1 |
| 5,732,920 A | 3/1998 | Reynoso | |
| D395,041 S * | 6/1998 | Leveridge et al. | D14/373 |
| D395,298 S | 6/1998 | Rosen | |
| 5,820,623 A | 10/1998 | Ng | |
| 5,842,672 A | 12/1998 | Sweere et al. | |
| 5,876,008 A * | 3/1999 | Sweere et al. | 248/325 |
| 5,881,986 A * | 3/1999 | Hegarty | 248/442.2 |
| 5,904,328 A | 5/1999 | Leveridge et al. | |
| 5,914,698 A | 6/1999 | Nicholson | |
| 5,918,841 A | 7/1999 | Sweere et al. | |
| 5,926,153 A | 7/1999 | Ohishi et al. | |
| 5,949,643 A | 9/1999 | Batio | |
| 6,012,693 A * | 1/2000 | Voeller et al. | 248/280.11 |
| 6,015,120 A | 1/2000 | Sweere et al. | |
| 6,019,332 A | 2/2000 | Sweere et al. | |
| 6,020,890 A | 2/2000 | Kohda | |
| D425,036 S | 5/2000 | Copus et al. | |
| 6,061,104 A | 5/2000 | Evanicky et al. | |
| 6,068,227 A * | 5/2000 | Morgan et al. | 248/278.1 |
| 6,134,103 A | 10/2000 | Ghanma | |
| 6,151,401 A | 11/2000 | Annaratone | |
| RE36,978 E | 12/2000 | Moscovitch | |
| 6,173,936 B1 * | 1/2001 | Hegarty | 248/442.2 |
| D440,543 S | 4/2001 | Kodimer | |
| 6,212,068 B1 * | 4/2001 | Rooyakkers et al. | 361/679.04 |
| 6,222,507 B1 | 4/2001 | Gouko | |
| 6,256,374 B1 * | 7/2001 | Tomasetti et al. | 378/98.2 |
| D448,023 S | 9/2001 | Kim | |
| D448,370 S | 9/2001 | Kim | |
| 6,295,038 B1 | 9/2001 | Rebeske | |
| D449,302 S | 10/2001 | Jung | |
| 6,302,612 B1 | 10/2001 | Fowler et al. | |
| 6,343,003 B1 | 1/2002 | Sakata et al. | |
| 6,343,006 B1 | 1/2002 | Moscovitch et al. | |
| 6,449,143 B2 | 9/2002 | Rooyakkers et al. | |
| D469,745 S | 2/2003 | Soule, Jr. | |
| D469,746 S | 2/2003 | Soule, Jr. | |
| 6,532,146 B1 | 3/2003 | Duquette | |
| 6,554,238 B1 | 4/2003 | Hibberd | |
| D477,325 S * | 7/2003 | Theis et al. | D14/451 |
| D477,606 S * | 7/2003 | Theis et al. | D14/451 |
| 6,587,082 B1 * | 7/2003 | Moore | 345/1.3 |
| 6,667,877 B2 | 12/2003 | Duquette | |
| 6,667,878 B2 | 12/2003 | Ponx | |
| 6,690,337 B1 * | 2/2004 | Mayer et al. | 345/1.1 |
| 6,702,604 B1 | 3/2004 | Moscovitch | |
| 6,739,096 B2 | 5/2004 | Feldpausch et al. | |
| 6,758,454 B2 | 7/2004 | Smed | |
| 6,963,487 B2 | 11/2005 | Billington et al. | |
| 7,061,754 B2 * | 6/2006 | Moscovitch | 361/679.21 |
| 7,188,812 B2 * | 3/2007 | Wang | 248/276.1 |
| 7,331,551 B2 * | 2/2008 | Oddsen, Jr. | 248/279.1 |
| 7,665,669 B2 * | 2/2010 | Steidinger et al. | 235/492 |
| D624,084 S * | 9/2010 | Scheper et al. | D14/452 |
| 7,878,476 B2 * | 2/2011 | Carson et al. | 248/429 |
| 2002/0011544 A1 | 1/2002 | Bosson | |
| 2003/0161094 A1 | 8/2003 | Chambers | |
| 2003/0231460 A1 * | 12/2003 | Moscovitch | 361/681 |
| 2004/0011938 A1 * | 1/2004 | Oddsen, Jr. | 248/393 |
| 2005/0121578 A1 | 6/2005 | Asamarai et al. | 248/284.1 |
| 2006/0176655 A1 * | 8/2006 | Hillman et al. | 361/683 |
| 2007/0084978 A1 * | 4/2007 | Martin et al. | 248/176.1 |
| 2008/0117578 A1 * | 5/2008 | Moscovitch | 361/681 |
| 2008/0173774 A1 * | 7/2008 | Saez et al. | 248/124.1 |
| 2008/0265114 A1 * | 10/2008 | Moscovitch | 248/176.3 |
| 2008/0284676 A1 * | 11/2008 | Moscovitch | 345/1.3 |
| 2009/0079665 A1 * | 3/2009 | Moscovitch | 345/1.3 |

FOREIGN PATENT DOCUMENTS

| | | |
|---|---|---|
| DE | 19802503 A1 | 7/1999 |
| EP | 1232427 | 8/2002 |
| GB | 2200783 | 8/1988 |
| GB | 2333391 | 7/1999 |
| JP | 62-197815 | 9/1987 |
| JP | 63-233417 | 9/1988 |
| JP | 10-55165 | 3/1989 |
| JP | 3-291722 | 12/1991 |
| JP | 04-015680 | 1/1992 |
| JP | 407160363 | 6/1993 |
| JP | 08-271979 | 10/1996 |
| JP | 09-230798 | 9/1997 |
| JP | 10-055165 | 2/1998 |
| JP | 11-271730 | 8/1999 |
| WO | 99/39328 | 8/1999 |
| WO | WO 99/39328 | 8/1999 |
| WO | 99 50813 | 10/1999 |
| WO | WO00/39493 | 12/1999 |
| WO | WO00/35196 | 6/2000 |
| WO | 01/35196 | 5/2001 |
| WO | WO01/35197 | 5/2001 |

OTHER PUBLICATIONS

U.S. Appl. No. 10/129,884, filed May 10, 2002, Moscovitch, Jerry.

Brochure on "Galileo 1S" from Specialized Technology Group, dated Sep. 8, 1998.

Advertisement from Smart Glas, dated Sep. 8, 1998.

Complaint for Patent Infringement, Civil Action No. 2-06CV-272, *Mass Engineered design, Inc. and Jerry Moscovitch vs. Ergotron, Inc., Dell Inc.*, CDW Corporation and Tech Data Corporation, filed Jul. 7, 2006.

Ergotron, "The Mac II Workstation," MacWeek, advertisement, vol. 12 (1988).

Ergotron Ergonomic Computer Workstations Somponent Product Catalog (labeled DEL 004607-DEL 004648; Jul. 1, 1992.

PC Workstation Publication (labeled DEL 004692 and also E-031429); Modern Office Technology; Nov. 1988.

National TeleVAR Publication (labeled DEL 004693); TypeWorld; First Aug. 1990; Issue 11.

Raster Devices 2 Direct Inc. Publication (labeled DEL 004690); Mar. 1990.

Ergotron Postcard Publication (labeled DEL 004691); 1992.

Raster Devices 2 Direct Inc. Publication (labeled DEL 004570); Apr. 1990.

Ergotron Postcard Publication (labeled DEL 004570); 1992.

Mac II Workstation Publication (labeled DEL 004571-DEL 004572); MacWEEK; Oct. 11, 1988.

Mac II Workstation Publication (labeled DEL 004573); MacWEEK; Oct. 11, 1988.

Ergotron Design Station Publication (labeled DEL 004574).

Raster Devices 2 Direct Inc. Publication (labeled DEL 004575); Apr. 1990.
Raster Devices 2 Direct Inc. Publication (labeled DEL 004576); Mar. 1990.
Graphics and Design Publication (labeled DEL 004579); "early '90s"?.
Ergotron LAN Racking and Cable Management Systems Product Catalog (labeled DEL 004580); Mar. 1, 1995.
Computer Racking System Publication (labeled E-031476); Managing Office Technology; Aug. 1993.
European Search Report for Application No. 00974 714.8-1245 (Publication No. EP1232427); Report dated Sep. 15, 2005.
European Search Report for Application No. 00974 714.8-1245 (Publication No. EP1232427); Report dated May 15, 2007.
Images of Multi Display System "XGA"; alleged to be prior art before Apr. 26, 1995.
European Office Action; May 4, 2005; Application No. 00971 660.6-1245; Jerry Moscovitch (Inventor).
European Office Action; Oct. 26, 2007; Application No. 00971 660.6-1245; Jerry Moscovitch (Inventor).
Chinese Office Action (Translation); Aug. 6, 2004; Application No. 00815588.7; Jerry Moscovitch (Inventor).
Japanese Office Action; Application No. 2001-536665; Inventor: Jerry Moscovitch; Oct. 13, 2009.
Canadian Office Action; Application No. 2,391,160; Inventor : Jerry Moscovitch; Oct. 23, 2009.
Canadian Office Action; Application No. 2,391,160; Inventor : Jerry Moscovitch; Oct. 15, 2007.
European Office Action; Application No. 00971660.6-1245; Inventor: Jerry Moscovitch; Jun. 23, 2009.
Japanese Office Action dated Jun. 8, 2010; Patent Application No. 2001-536665; in re application of Jerry Moscovitch.
Complaint for Patent Infringement of U.S. Patent No. Re36,978; filed in the United States District Court for the Eastern District of Texas by Jerry Moscovitch and Mass Engineered Design Inc. on Nov. 12, 2009; Civil Action Case No. 209 CV 358.
Cover Letter from matthew J.S. Graham, Attorney for Ergotron, Inc.; dated Aug. 14, 2009.
DS100 Flyer dated Jul. 23, 2002.
DS100 Install Manual dated Mar. 2003.
FP Order Guide dated Dec. 12, 2002.
FPM Arm Catalog dated Aug. 2002.
XBar Extens Install Manual dated Mar. 2003.
Invoice No. 196156 to Bloomberg.
Invoice No. 158382 to Trikinetic Technologies.
Invoice No. 158045 to Baymont Inn.
Package from Damon A. Neagle of Design IP (representing Innovative Office Products, Inc.) dated Jan. 8, 2010; package includes cover letter, and six appended documents (Tabs 1-6).
Translation of Japanese Office Action; Feb. 3, 2010; Patent Application No. 2001-536665; application of Jerry Moscovitch.
Canadian Office Action; Oct. 7, 2010; Patent Application No. 2,391,160; application of Jerry Moscovitch.
Translation of Chinese Office Action; Aug. 6, 2004; Patent Application No. 008515 887; application of Jerry Moscovitch.
European Office Action; Mar. 19, 2010; Patent Application No. 00971 660.6-1245; application of Jerry Moscovitch.
European Office Action; May 4, 2005; Patent Application No. 00971 660.6-1245; application of Jerry Moscovitch.
Chief Manual—Installation Instructions; obtained from website http://downloads.chiefmfg.com/MANUALS-I/KTPSeries-I.pdf dated Mar. 2010.
Planar Manual—Installation Instructions; obtained from website http://www.planar.com/products/docs/cbu/current_manual/Dual-Quad-Stand-manual.pdf on Feb. 18, 2011.
Knoll brochure http://www.knoll.com/products/pricelists/KnollExtra_Wishbone_update42106.pdf downloaded May 25, 2010; 1999 and 2000 design awards mentioned on p. 109.
FX The Business of Design Article on Colebrook Bosson and Saunders (designers of Knoll Wishbone product); article written by Jamie Mitchell; article states Wishbone flat screen arm was developed in 1999 Article found at: http://www.fxmagazine.co.uk/story.asp?storyCode=2397 Article dated Mar. 11, 2009.
Ergotron Installation Manual DS100 Desk Stands dated Dec. 2001.
Trial transcripts from morning of Nov. 10, 2008 and from Nov. 17, 2008 from Civil Action No. 2-06CV-272; *Mass Engineered Design Inc. and Jerry Moscovitch* vs. *Ergotron, Inc., Dell Inc.*, CDW Corporation and Tech Data Corporation, filed Jul. 7, 2006.
EZOffice Inc. Aluminum Die-Casting Quad LCD Arm Features http://ezofficeinc.com/?p. id=271 copyright 2011.
Anthro Corporation ("More Arms" section) http://www.anthro.com/furniture.aspx?computer-cart=security-stools-more-arms copyright 2011.
Cotytech http://www.cotytech.com/content-categories/cat-191_194_214/dual_monitor_mounts.html representative DM-21A2 specification copyright 2005-2011.
Mayline Group http://www.mayline.com/showcase/transaction/tech_accessories.html copyright 2010.
Modern Solid http://www.mosolid.comtw/product.php?mode=list&cid=81 representative LA-6A7-1 and LA-935 products copyright 2010.
Highgrade Tech Co. Ltd; http://www.highgrade.com.tw/ (print out obtained from "LCD Monitor Stand" Section) representative TS743 product downloaded Aug. 2011.

* cited by examiner

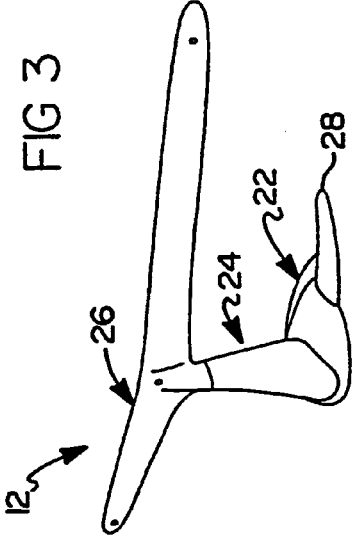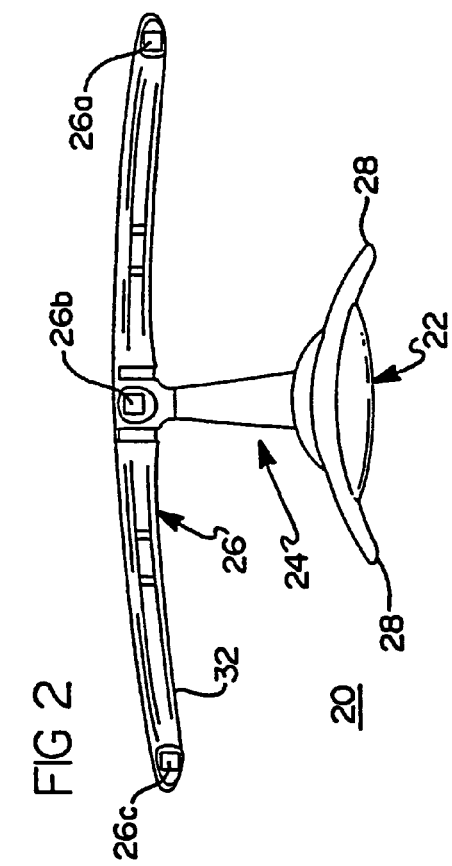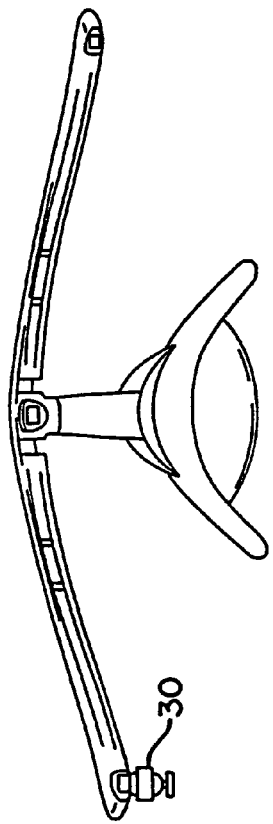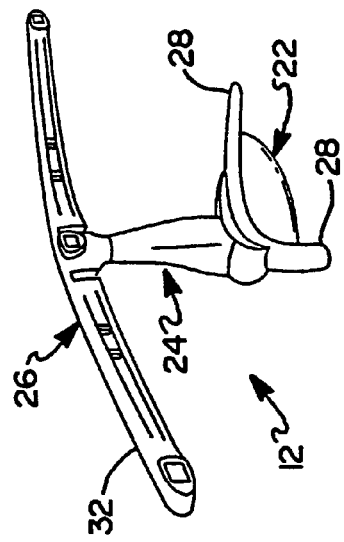

HORIZONTAL THREE SCREEN LCD DISPLAY SYSTEM

CROSS REFERENCE TO RELATED APPLICATIONS

Incorporated by reference herein are U.S. Provisional Application No. 60/165,047, filed Nov. 12, 1999 and International Application No. PCT/IB00/01646, filed Nov. 13, 2000, which application was published in the English language. Priority is claimed from both of these applications.

TECHNICAL FIELD

This invention relates to display systems for computers, and more particularly to a multi-screen display system for use with a computer system, where the multi-screen display system includes three independent liquid crystal display screens disposed adjacently to one another on a common arm extending along a horizontal plane.

BACKGROUND OF THE INVENTION

Multi-screen displays are becoming more and more popular for use in various businesses, such as in financial institutions, stock market brokerage firms, engineering companies and the like. These displays are commonly coupled to a single computer and capable of displaying various graphs, charts and other important information simultaneously. Thus, a large amount of data or information can be displayed to the user at any given time, and without the user having to partially cover portions of the information in a "windowed" or layered arrangement, as would be necessary with only a single display screen.

Up until the present, most multi-screen display systems have been limited to two independent display screens positioned side-by-side. The angle of the screens relative to each other has usually not been adjustable, and often the displays have been required to be set directly on a table or desk, thereby using a significant amount of space. To date, there has not been a convenient and efficient means to provide three independent display screens and to support the three screens in a manner which minimizes the footprint area of the system, and which still allows one or more of the screens to be adjusted slightly such that at least two of the screens can be angled or "booked" toward each other to further enhance the ease with which information can be viewed on the three screens.

It is therefore an object of the present invention to provide a display system for use with a computer system, where the display system incorporates three independent display screens supported on a common horizontal support arm, and elevated by a support column so as significantly reduce the footprint area required by the display system.

It is another object of the present invention to provide a display system for use with a computer system, where the display system incorporates three independent liquid crystal display (LCD) screens mounted on a common, horizontally disposed arm. It is still another object of the present invention to provide a display system for use with a computer system, where the display system incorporates three independent LCD screens, and wherein at least two of the screens are capable of being angled or "booked" toward each other to optimize the viewing angle of the screens relative to the user.

SUMMARY OF THE INVENTION

The above and other objects are provided by a multi-screen display system in accordance with preferred embodiments of the present invention. In one preferred embodiment the display system comprises a base, a support column extending vertically from the base, a horizontally disposed support arm supported on the column, and three independent liquid crystal display (LCD) screens supported on the support arm. In one preferred embodiment each of the LCD screens is coupled to the support arm by a suitable ball joint which allows the viewing angle of each screen to be adjusted to optimize the viewing angle of each screen.

The base is substantially smaller in width than the horizontal support arm, thus freeing up a significant amount of desk space. Since LCD screens are employed, the entire display system is much more compact and able to be placed much closer to a wall or other vertical partition than would be possible with conventional cathode ray tube display systems. The horizontal support column, in one preferred form, is slightly bowed such that the three LCD screens are presented in a slight arc to the user when the user is seated in front of the display system. This further eases the manner in which information can be viewed on the two outer LCD screens.

The display system thus provides a compact yet convenient means for displaying a large amount of information simultaneously on three LCD screens in a manner allowing the user to easily view any one of the screens from a seated or standing position in front of the display system. The display system is sufficiently compact such that it can be used in work areas where three conventional cathode ray tube screens would be too bulky to employ.

BRIEF DESCRIPTION OF THE DRAWINGS

The various advantages of the present invention will become apparent to one skilled in the art by reading the following specification and subjoined claims and by referencing the following drawings in which:

FIG. 2 is a front view of just the support system with the LCD screens removed;

FIG. 3 is a rear perspective view of just the support system of FIG. 2;

FIG. 4 is a front perspective view of the support system of FIG. 2;

FIG. 5 is a top perspective view of just the support system illustrating the slightly bowed configuration of the horizontal support arm;

DETAILED DESCRIPTION OF THE PREFERRED EMBODIMENTS

Figure 1:
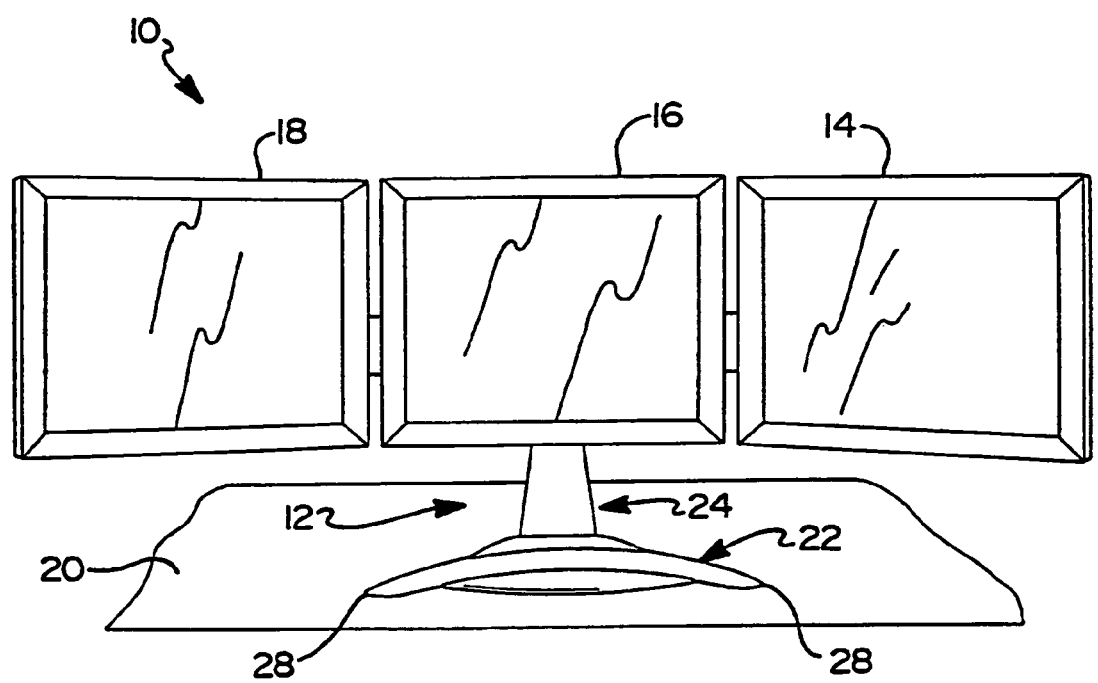
FIG. 1 is front view of a display system in accordance with a preferred embodiment of the present invention.

Referring to FIG. 1, there is shown a three panel liquid crystal display (LCD) display system 10 in accordance with a preferred embodiment of the present invention. The system 10 includes a support system 12 and three independent LCD screens 14, 16 and 18 which are supported above a work surface 20. The system 10 forms a means for presenting a large amount of information to a user seated or standing in front of the system 10. While not shown, it will be appreciated that each LCD screen 14, 16, and 18 includes its own video controller card which receives information from a computer system (not shown) associated with the display system 10.

Referring to FIGS. 2-5, the support system 12 can be seen in greater detail with the LCD screens 14, 16 and 18 removed. The support system 12 comprises a base 22, a vertical support column 24 fixedly secured to the base 22, and a slightly bowed or arched horizontal support arm 26. The base 22 includes a pair of feet 28 which provide even further stability in supporting the LCD screens 14, 16 and 18. Preferably, the base 22 includes a weighted structure, such as a lead plate, which is insert molded with the base to provide a suitably heavy structure for supporting the LCD screens 14, 16 and 18 in a manner that resists tipping of the screens 14, 16 and 18 if same are inadvertently bumped.

The vertical support column 24 is of a suitable height such that when the LCD screens 14, 16 and 18 are attached to the horizontal support arm 26, the screens are all disposed above the work surface 20. This places the screens 14, 16, and 18 at a convenient viewing height for the user while also freeing up space under the two outer screens 14 and 18 for papers or other items which the user requires access to.

The horizontal support arm 26 is preferably formed (i.e., cast) as a single piece component and has three docking stations 26a, 26b and 26c where a suitable ball joint is attached at each station. One such ball joint 30 is shown in simplified form in FIG. 5 attached to docking station 26c. The ball joints 30 allow each LCD screen 14, 16 and 18 to be precisely angled or "booked" toward the other screens to optimize the viewing angle of each screen relative to the user. The slightly bowed configuration of the horizontal support arm further helps to place the LCD screens 14, 16 and 18 in a manner such that the screens "wrap around" the user and further enhance the ease with which each screen may be viewed. The radius of curvature is preferably within a range of about 24"-36", and more preferably about 30", which has been found to ergonomically maximize the convenience to the user in viewing the LCD screens.

The horizontal support arm 26 further includes a channel 32, visible in FIGS. 2, 4 and 5, which forms an area within which power and/or video cables can be positioned to help keep same off of the work surface 20.

Figure 6:
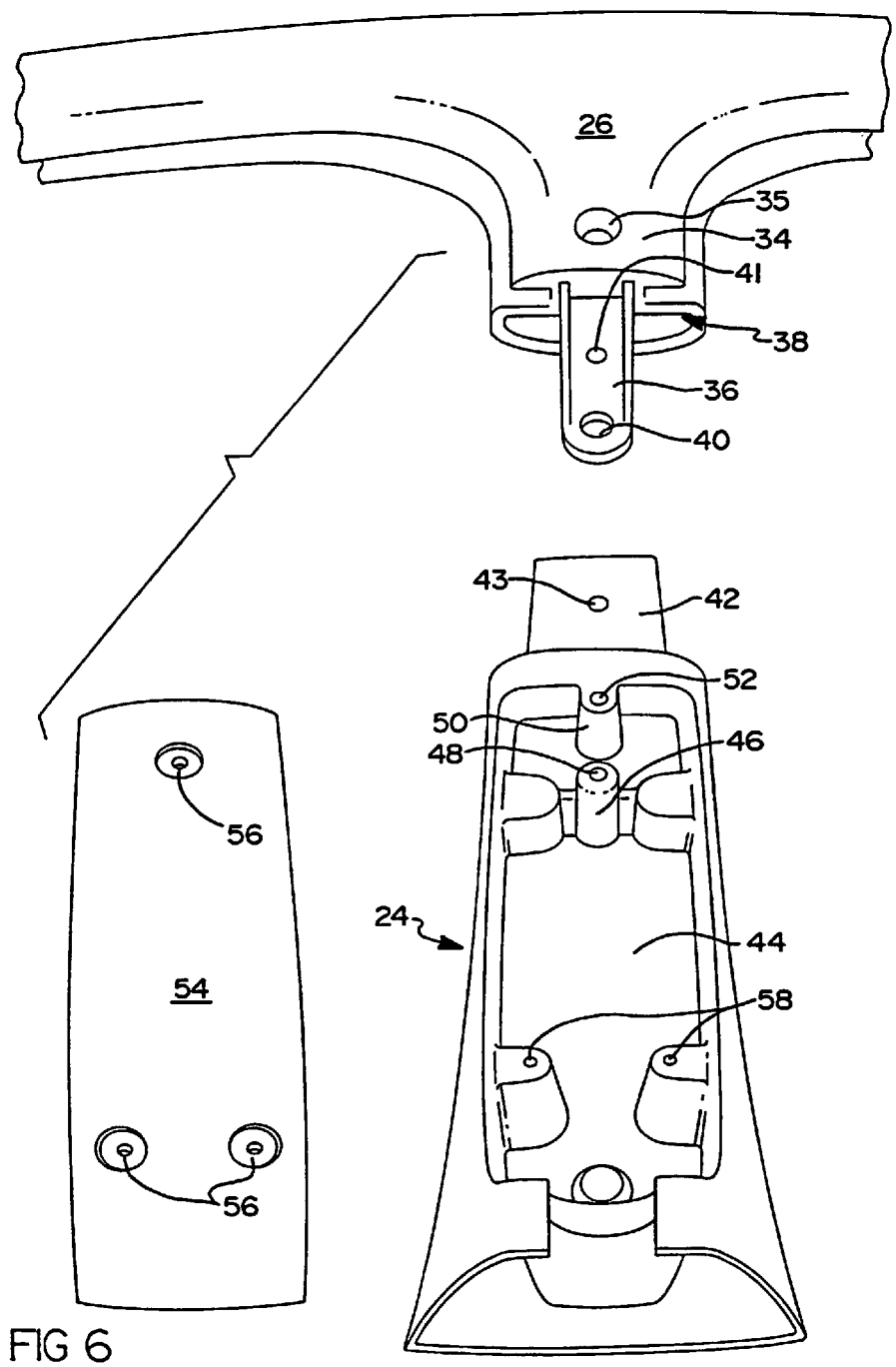
FIG. 6 is a perspective view of a portion of the horizontal support arm showing the mounting member, and a perspective view of a portion of the vertical support column illustrating the mounting member thereof, and a perspective view of the cover.
Figure 7:
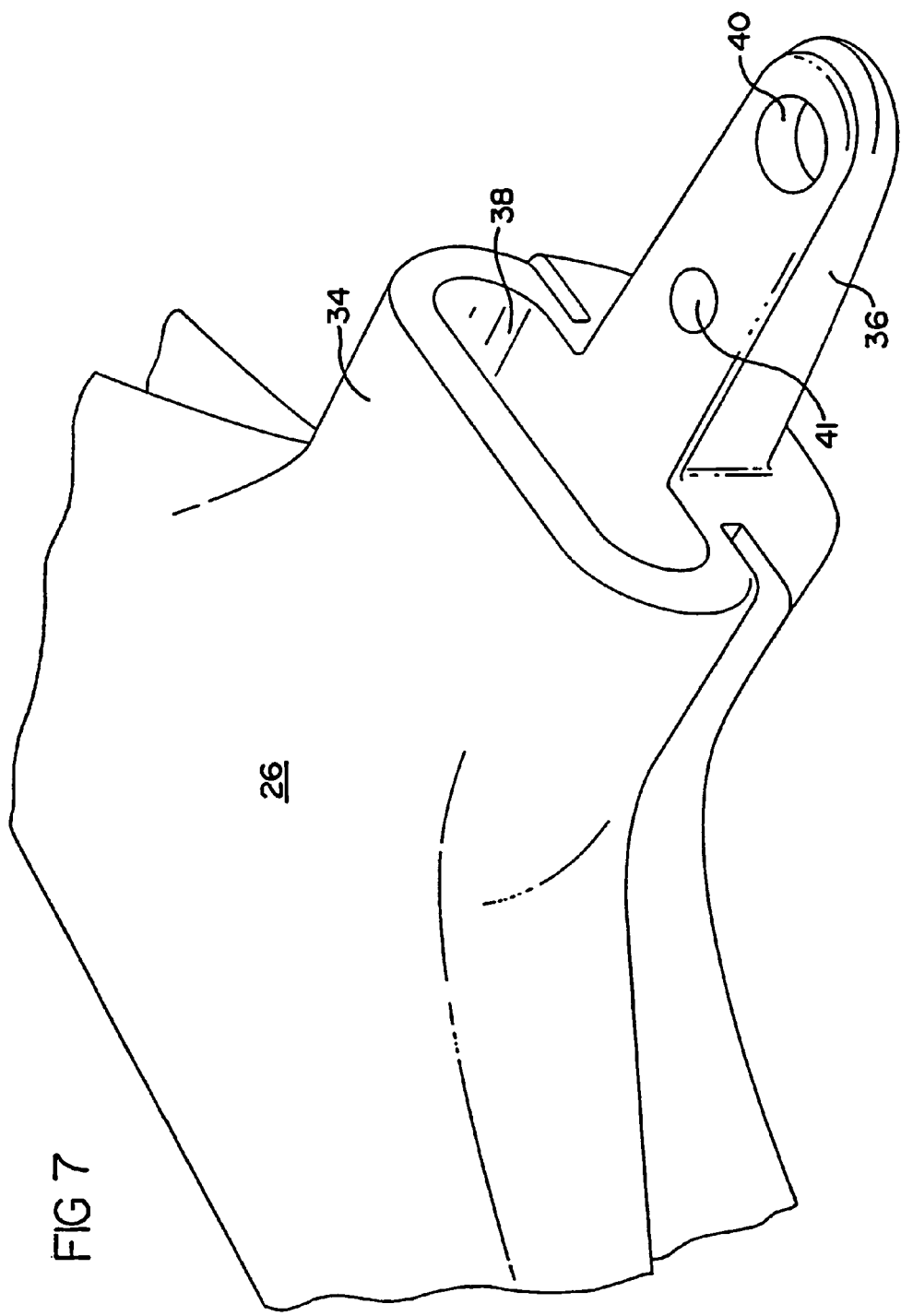
FIG. 7 is perspective, enlarged view of a portion of the horizontal support arm showing the recess formed in the neck portion thereof.

Referring now to FIG. 6, the horizontal support arm 26 includes a neck portion 34 having a mounting member or portion 36 protruding therefrom and a recess 38. The recess 38 can be seen in greater detail in the drawing of FIG. 8. The mounting member 36 includes an aperture 40 and an aperture 41. The neck portion also 34 includes an aperture 35.

The vertical support column 24 similarly includes a mounting member or portion 42 and a hollowed out area 44. Mounting member 42 includes an aperture 43. A first boss portion 46 has a threaded bore 48 and a second boss portion 50 has a threaded bore 52. A separate cover 54 is adapted to be secured to the vertical support column 24 by a plurality of external fastening elements (not shown) placed in apertures 56, which extend into bores 58 formed in bosses 60, and into bore 52, within the hollowed out area 44. The cover 54 is shaped to cover the hollowed area 44 and to provide the appearance of an integrally formed portion of the vertical support column 24 when secured thereto.

Figure 8:
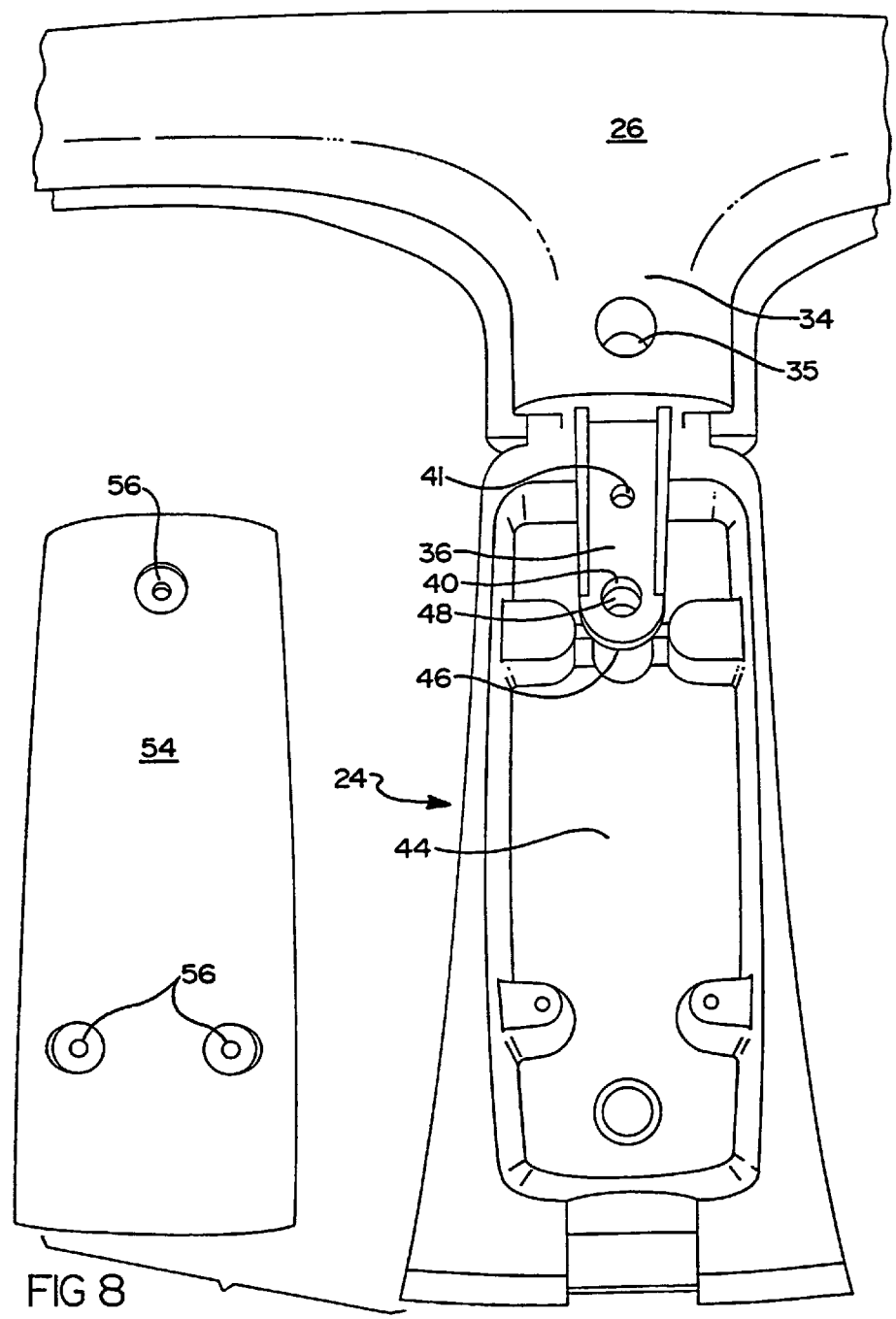
FIG. 8 is a perspective view of a portion of the horizontal support arm positioned for attachment to the vertical support column.
Figure 9:
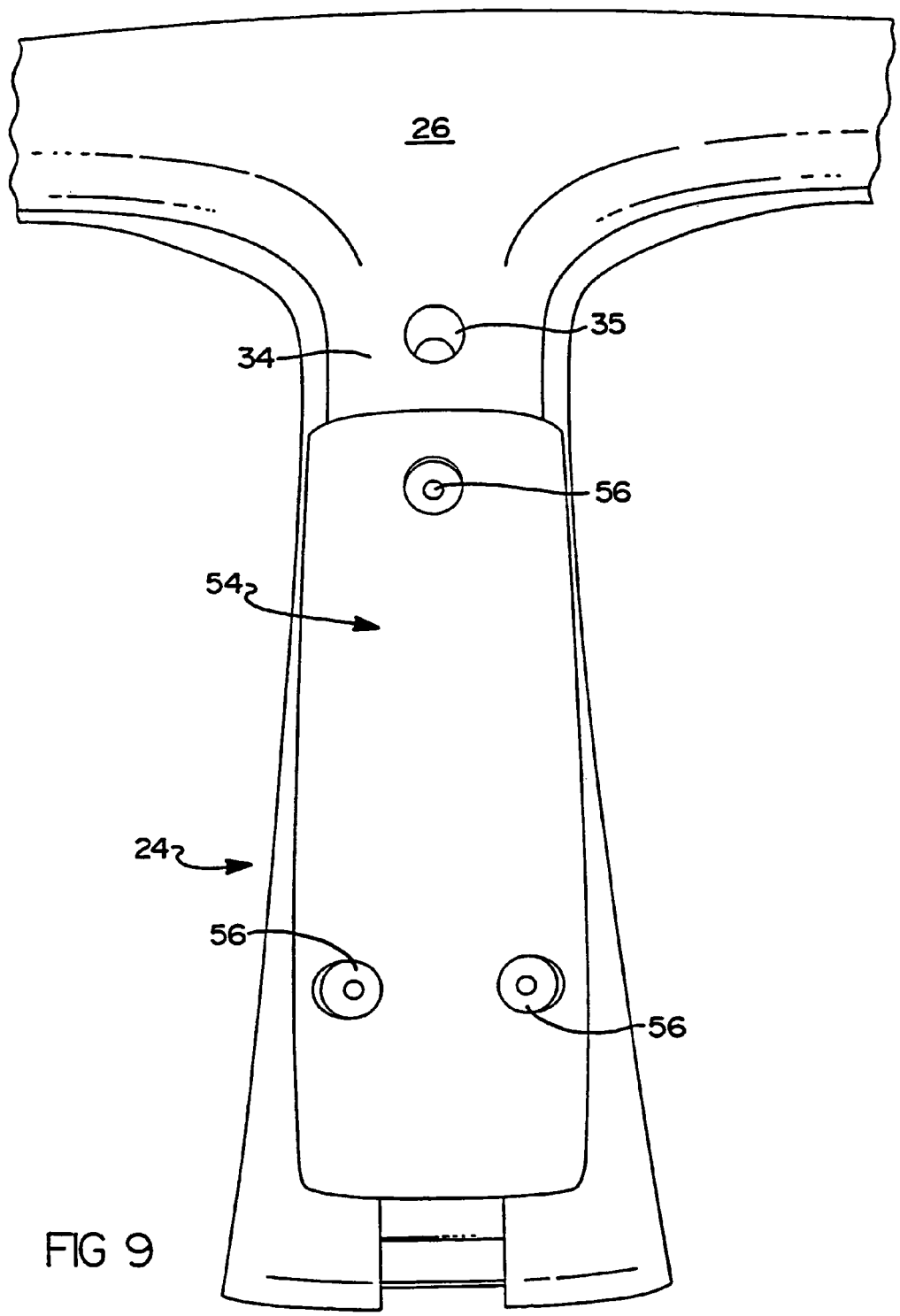
FIG. 9 is a perspective view of a portion of the horizontal support arm showing this arm ready for attachment, with the cover positioned thereover, to the vertical support column.

Referring now to FIG. 8, the mounting member 36 of the horizontal support arm 26 can be seen positioned for securing to the vertical support column 24. The mounting member 42 is inserted within the recess 38, and the mounting member 36 lays over the two boss portions 46 and 50 with apertures 40 and 41 aligned with apertures 48 and 52, respectively. An external fastening element (not shown) can then be inserted through aperture 40 and into bore 48, and a separate external fastening element (not shown) inserted into aperture 35 to engage in aperture 43. Further external fastening elements (not shown) can be inserted through apertures 56 and into bores 58 and 52 to secure the cover 54 to the vertical support column 24. The cover 54 is shown positioned on the support column 24 in FIG. 9 ready to be secured thereto by external fastening elements.

It will be appreciated that the above-described arrangement permits the horizontal support arm 26 to be removed and an even longer horizontal support arm, possibly long enough to support four LCD screens, could be attached to column 24. Alternatively, a horizontal support arm adapted to support only two screens could just as easily be secured to the column 24. This construction thus lends itself very well to providing a modularly expandable display system.

It will be appreciated then that the display system 10 of the present invention provides a convenient, user friendly means for supporting three screens along an elevated, common horizontal support arm. This not only frees up workspace on the desk or table on which the display system 10 is disposed, but also presents the display screens at a height above the work surface that makes the display system comfortable to view.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

The invention claimed is:
1. A display system comprising
a base;
a support column connected to the base and having a mounting portion extending in a vertical direction away from the base when the base is disposed on a horizontal surface;
a support arm structure secured to the support column, the support arm structure having a single piece support arm that extends on either side of the support column and that has a longitudinal length that is longer than the width of the base; and
at least two connectors for connecting display housing portions at the backs of at least two displays to the support arm, such that at least a part of the support column is disposed behind the at least two displays, wherein:
the support arm is a) bowed at the front of the support arm so that in use the support arm tends to wrap around a user positioned in front of and viewing the displays, b) adapted to support all of the weight of the at least two displays when the display housing portions at the backs of the at least two displays are connected to the support arm, and c) substantially horizontal in use, the support arm structure further comprising a mounting member with a hole and at least one aperture, such that the support arm structure, and the single piece support arm thereof, is secured to the support column through the mounting member by an acceptance of the mounting portion of the support column into the hole and by at least one external fastening element that engages with the at least one aperture.

2. The display system of claim 1, further comprising the at least two displays.

3. The display system of claim 1, wherein the base is adapted to rest on a flat and horizontal work surface.

4. The display system of claim 3, wherein at least two of the connectors permit two of the displays to angle independently.

5. The display system of claim 1, wherein the support arm is bowed at the front oldie arm, the support arm having a radius of curvature in the range of 24-36 inches.

6. The display system of claim 4, wherein the support arm includes a channel within which cables for the displays can be disposed.

7. The display system of claim 1, wherein the at least two connectors includes three connectors and the at least two displays includes three displays, the display system comprising the three displays.

8. The display system of claim 1, wherein the support arm is rigid.

9. A display system comprising:
a base for resting on a surface;
a support column attached to the base and having a mounting portion extending in a vertical direction away from the base when the surface is horizontal;
a support arm structure secured to the support column, the support arm structure having a support arm that extends on either side of the column, that is substantially horizontal when the base is resting on a horizontal surface and that has a longitudinal length that is longer than the width of the base;
at least two connectors for connecting display housing portions at the backs of at least two displays to the support arm, such that at least a part of the support column is disposed behind the at least two displays, wherein:
i) the front of the support arm on one side of the support column is bowed, and the front of the support arm on the other side of the support column is bowed so that in use the support arm tends to wrap around a user positioned in front of and viewing the displays, and ii) the support arm is adapted to support most of the weight of the at least two displays when the display housing portions at the backs of the at least two displays are connected to the support arm, the support arm structure further comprising a mounting member with a hole and at least one aperture, such that the support arm is secured to the support column through the mounting member by an acceptance of the mounting portion of the support column into the hole and by at least one external fastening element that engages with the at least one aperture.

10. The display system of claim 9, wherein the support arm supports all of the weight of the displays when the displays are connected to the support arm.

11. The display system of claim 10, wherein the support arm has a plane asymmetry perpendicular to the arm, said plane being vertical when the base is resting on a horizontal surface.

12. The display system of claim 10, wherein the bowed part of the support arm describes a smooth curve.

13. The display of system 10, further comprising at least two holes at the back of the support arm, one for each connector, for securing the at least two connectors to the support arm.

14. The system of claim 9 wherein the support arm is formed as a single piece component.

15. The system of claim 1, further comprising at least two holes at the back of the support arm, one for each connector, for securing the at least two connectors to the support arm.

16. The system of claim 1, wherein the thickness of the support arm is less than the distance between adjacent connectors.

17. The system of claim 9, wherein the thickness of the support arm is less than the distance between adjacent connectors.

18. The system of claim 9, wherein the front of the support arm on one side of the support column has a radius of curvature in the range of 24-36 inches, and the front of the support arm on the other side of the support column has a radius of curvature in the range of 24-36 inches.

* * * * *